United States Patent [19]

Warner

[11] 4,267,870
[45] May 19, 1981

[54] SCREW FASTENER WITH MULTI-POINT WRENCHING HEAD AND LOCKING CAPABILITIES

[75] Inventor: John R. Warner, Rocky River, Ohio

[73] Assignee: The Ferry Cap & Set Screw Co., Cleveland, Ohio

[21] Appl. No.: 959,523

[22] Filed: Nov. 13, 1978

[51] Int. Cl.³ .................. F16B 23/00; F16B 39/10
[52] U.S. Cl. .................................. 411/98; 411/122; 411/410
[58] Field of Search .............. 151/53, 44, 45, 60, 151/54, 64; 85/61, 9 R, 45

[56] References Cited

U.S. PATENT DOCUMENTS

| | | | |
|---|---|---|---|
| 87,953 | 3/1869 | McCown | 151/60 |
| 627,323 | 6/1899 | Caron | 151/53 |
| 3,812,757 | 5/1974 | Reiland | 85/61 |

FOREIGN PATENT DOCUMENTS

| | | | |
|---|---|---|---|
| 112881 | 1/1945 | Sweden | 151/45 |
| 910446 | 11/1962 | United Kingdom | 151/53 |
| 913407 | 12/1962 | United Kingdom | 151/53 |

Primary Examiner—Ramon S. Britts
Attorney, Agent, or Firm—Maky, Renner, Otto & Boisselle

[57] ABSTRACT

A screw fastener with a multi-point wrenching head and locking capabilities characterized by an annular bearing collar having at least one flat surface on its periphery adapted for engagement with the locking tab of a locking strip.

4 Claims, 5 Drawing Figures

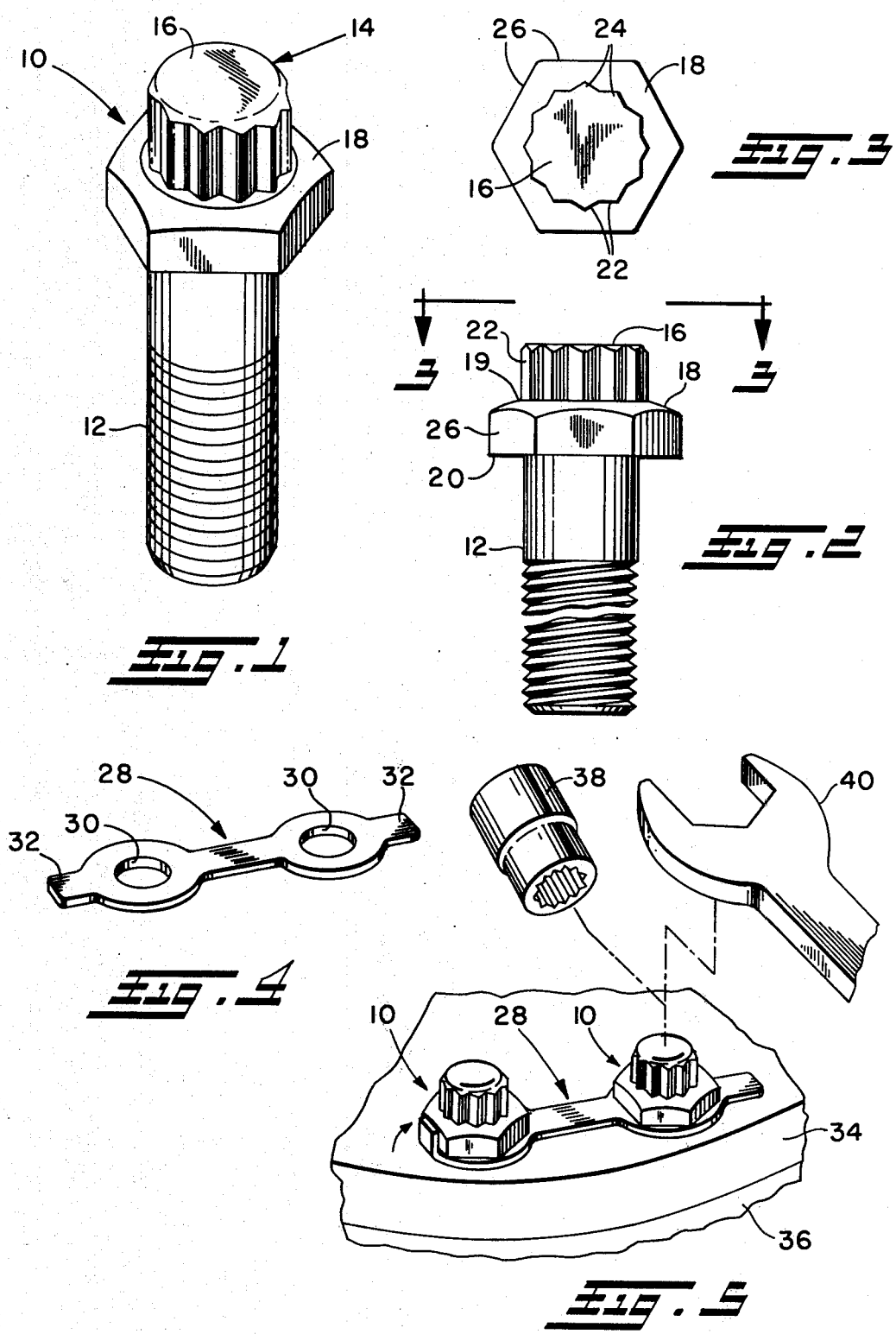

SCREW FASTENER WITH MULTI-POINT WRENCHING HEAD AND LOCKING CAPABILITIES

BACKGROUND OF THE INVENTION

This invention relates generally to headed fasteners such as screws, bolts and the like, and more particularly, to screws with multi-point wrenching heads having locking capabilities, and locks therefor.

Cap head screws having multi-point wrenching heads may be advantageously used in standard counterbored holes in lieu of sockethead cap screws in that they provide for tighter and faster wrenching. In addition, such fasteners with multi-point wrenching heads are lighter in weight, have less flange width, and are less costly for a given torque requirement. The improved wrenching results because of the external and increased peripheral wrench-engaging surface on the head of the screw which provides for better leverage. More particularly, plural wrenching surfaces are advantageously angled substantially radially and disposed radially outwardly to a greater extent than the wrenching surfaces of sockethead cap screws thereby improving the wrenching angle and leverage which increases substantially the amount of torque that can be applied before the screw head deforms as compared to comparatively sized socket-head cap screws. Accordingly, ultimate product cost, weight and size can be reduced by employing multi-point wrenching screws over socket-head cap screws.

These same advantages will result, although to a lesser degree, by using such fasteners with multi-point wrenching heads in applications other than counterbores. However, in some applications, such as turbines, compressors, engines and the like where the component parts of the assemblies are subject to vibration and shock, it may be necessary to provide a lock for the screws to prevent loosening thereof. Until now no way has been found effectively to lock multi-point wrenching screws in such applications, whereby the less desirable square or hex-head fasteners had to be employed because of their ability to be locked against loosening due to vibrations and like by using such locking devices as locking strips having locking tabs that can be bent against one of the flat driving surfaces of the fastener head to prevent undesired turning of the fastener.

SUMMARY OF THE INVENTION

With the foregoing in mind, it is a principal object of this invention to provide a screw fastener or the like of the type described with a multi-point wrenching head and locking capabilities.

Another object is to provide such a screw fastener and a lock therefor.

Still another object is to provide a screw fastener or the like having locking capabilities and also improved wrenching, appearance and weight characteristics.

Yet another object is to provide such a screw fastener that may be readily fabricated from existing multi-point wrenching screw stock.

A further object is to provide such a screw fastener or the like that may normally be wrenched bu standard multi-point torque applying tools, but may laternatively be wrenched when necessary by other wrenches such as used with polygonal shape head fasteners, or, in other words, to provide both primary and secondary wrenching means in a single fastener.

These and other objects of the present invention may be obtained by providing a screw fastener or the like with a head and a shank, the shank thereof being coaxial with the head and having at least a portion thereof threaded, and the head having a multi-point wrenching portion and an annular flange or collar portion having at least one flat side surface substantially parallel to the axis of the fastener adapted to be engaged by a locking element. Preferably, twelve such points are formed providing a standard-size twelve-point wrenching head portion with which standard multi-point torque applying tools may be used, and the annular collar portion is of a square or hexagonal shape conforming to a standard size to provide for additional or secondary wrenching of the screw fastener. Such a screw fastener may readily be locked against rotation relative to the member to which it is fastened and/or which it is securing with the use of a locking strip of the type having tabs which are bendable into engagement with the flat wrenching surfaces of known square or hex-head fasteners. Such locking strips are normally used with two screw fasteners of the present invention receivable in apertures provided in the locking strips to prevent the latter from turning and are provided with locking tabs corresponding to the screws, each such tab projecting beyond the periphery of the corresponding collar portion and each being deformable into engagement with at least one flat surface of the collar portion to prevent rotation.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is an isometric view of a preferred form of multi-point screw fastener of the present invention;

FIG. 2 is a side elevation of the screw fastener of FIG. 1;

FIG. 3 is a top plan view of the screw fastener of FIG. 2 as seen from the plane of the line 3—3 thereof;

FIG. 4 is a perspective view of a conventional locking strip;

FIG. 5 is a perspective view showing a typical installation utilizing the screw fasteners of the present invention in conjuction with a locking strip for precluding rotation of the screw fasteners relative to the members to which they are secured and/or are securing.

DESCRIPTION OF THE PREFERRED EMBODIMENT

Referring now in detail to the drawings and initially to FIGS. 1-3 thereof, a preferred form of screw fastener in accordance with the present invention is generally indicated by reference numeral 10, and comprises a shank 12 and coaxial head 14 having a wrenching or driving portion 16. An annular flange or collar portion 18 is provided on the shank adjacent the axial inner end of the screw head 14. The top surface 19 of the collar portion 18 acts as a stop surface for the wrenching portion 16, whereas the bottom surface 20 thereof has a shoulder or bearing surface which bears against the part being retained when the fastener is tightened in place. The shank 12 may be fully threaded or partially threaded as shown in the drawing, or may take any of the forms well known in the screw fastener art.

The wrenching portion 16 of the screw head 14 is formed in a standard multi-point external wrenching head (a standard twelvepoint external wrenching head being shown) thus providing a larger gripping surface for better, quicker and tighter wrenching.

The annular collar portion 18, in contradistinction to known multi-point wrenching fasteners, includes at least one flat side surface 26 substantially parallel to the axis of the fastener and preferably chordal to a circle generally corresponding to the radially outer periphery of the annular collar portion to permit a locking strip 28 such as shown in FIG. 4 to be employed with the fastener in a manner to be subsequently described. A plurality of such chordal surfaces 26 may be arranged to give the annular collar portion a polygonal shape such as the hexagonal shape shown which may correspond to a standard hex-head size.

The locking plate 28 may be of conventional type formed from an elongate flat plate having at each end thereof an aperture 30 through which two such fasteners 10 may extend. Projecting outwardly at the distal ends of the locking strip are locking tabs 32 which are deformable to a position normal to the major extent of the locking strip for a purpose to be described below.

Referring now to FIG. 5, a typical assembly is shown employing a plurality of such screw fasteners 10 of the present invention in an application other than in counterbores and in which the above described locking strip 28 is used with such screw fasteners to prevent loosening thereof due to vibrations and the like. The locking strip 28 is positioned so that the openings 30 thereof are aligned with bores provided in the machine components 34 and 36 to be secured, and two such screw fasteners 10 are inserted through such openings 30 and into such bores and tightened by suitable torque applying tools such as a standard multi-point socket 38 driven by a suitable wrench (not shown) with the bearing surface 20 engaging the exposed surface of the locking strip.

With the screw fasteners tightened to a desired torque, and with the flat side surfaces 26 of the annular collar portions of the fasteners facing the tabs 32 of the locking strip, such tabs may be deformed upwardly into engagement with a corresponding flat side surface as shown at the left in FIG. 5 to prevent inadvertent loosening of the fasteners due to vibrations and the like. By providing a plurality of such flat side surfaces 26, alignment of one of them with the associated locking tab is facilitated thereby reducing the amount of over or under torquing required to achieve such alignment.

The plural flat side surfaces on the collar portion may also be used for secondary wrenching of the screw fastener. This would be particularly advantageous in a situation where a suitable multi-point socket or like tool sized to fit the wrenching head portion 16 is not conveniently available. In that event, the screw fastener may either be tightened or loosened, as necessary, by using a torquing tool conforming to the shape of the collar portion, for example, an open-ended hex-wrench 40 adapted to engage the flat surfaces 26 of the annular collar 18. Of course, it is preferred that all wrenching be done by driving the wrenching head portion 16 with a suitable tool. Although the screw fastener of the present invention is shown and described for use in combination with the locking strip 28, it will be understood by those skilled in the fastener art that the screw fastener may also be used with other types of locks adapted to engage the flat side face of the collar portion to preclude rotation of the screw.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A fastener construction having primary wrenching, secondary wrenching and locking capabilities comprising a multi-point wrenching fastener having a shank portion threaded at one end and having a normally non-shearable primary multi-point wrenching portion at the other end adapted for use with a multi-point wrenching tool, and an annular bearing collar portion, having an inner bearing surface, integral with said shank portion axially inwardly adjacent said multi-point wrenching portion, said collar portion having a greater cross-sectional area than said shank portion and including at least two flat chordal side surfaces on the outer periphery of said collar portion extending from said inner bearing surface substantially parallel to the axis of the fastener and to each other to define a secondary wrenching portion adapted for use with another type of wrenching tool, said primary wrenching portion being of lesser cross-sectional area than said secondary wrenching portion, and lock means engageable with any one of said flat chordal side surfaces of said collar portion for preventing rotation of said fastener when received in a bore in a member to be secured, said lock means including a thin elongate strip having an aperture for receiving the threaded end of said fastener and including tab means adapted to be bent into flush engagement with any one of said flat chordal side surfaces of said collar portion for preventing rotation of said fastener relative to said elongate strip, and means for preventing rotation of said strip relative to the member being secured.

2. The fastener construction of claim 1 further comprising a second of said fasteners, to be threadedly received in a second bore in the member to be secured; and said lock means comprises a thin, elongate strip having a pair of longitudinally spaced apertures therein to receive the threaded ends of said fasteners, and a pair of tabs projecting from said strip adjacent said pair of apertures adapted to be bent into flush engagement with any one of said flat chordal side surfaces of said collar portions on said fasteners to prevent rotation of said fasteners relative to said elongate strip.

3. The fastener construction of claim 1 wherein said primary wrenching portion has a number of flat wrenching surfaces substantially parallel to the axis of the fastener arranged to form one half of such number of symmetrical, radially projecting, closely circumferentially spaced flat surfaced wedge-shaped points.

4. The fastener construction of claim 3 wherein said primary wrenching portion has twelve of said points and said collar portion is a regular hexagon.

* * * * *